United States Patent
Song (10) Patent No.: US 12,057,599 B2
(45) Date of Patent: Aug. 6, 2024

(54) SECONDARY BATTERY SEPARATOR TO IMPROVE THE BATTERY SAFETY AND CYCLE LIFE

(71) Applicant: XERABRID CO., LTD., Chungcheongbuk-do (KR)

(72) Inventor: Seungwon Song, Irvine, CA (US)

(73) Assignee: Xerabrid Co., Ltd. (KR)

( * ) Notice: Subject to any disclaimer, the term of this patent is extended or adjusted under 35 U.S.C. 154(b) by 276 days.

(21) Appl. No.: 17/528,640

(22) Filed: Nov. 17, 2021

(65) Prior Publication Data

US 2023/0115564 A1    Apr. 13, 2023

(30) Foreign Application Priority Data

Oct. 13, 2021    (KR) .......................... 10-2021-0135678

(51) Int. Cl.

| | |
|---|---|
| H01M 50/457 | (2021.01) |
| H01M 10/052 | (2010.01) |
| H01M 10/42 | (2006.01) |
| H01M 50/409 | (2021.01) |
| H01M 50/417 | (2021.01) |
| H01M 50/431 | (2021.01) |
| H01M 50/434 | (2021.01) |
| H01M 50/443 | (2021.01) |
| H01M 50/446 | (2021.01) |
| H01M 50/451 | (2021.01) |
| H01M 50/46 | (2021.01) |
| H01M 50/489 | (2021.01) |

(52) U.S. Cl.
CPC ....... *H01M 50/457* (2021.01); *H01M 10/052* (2013.01); *H01M 10/4235* (2013.01); *H01M 50/409* (2021.01); *H01M 50/431* (2021.01); *H01M 50/434* (2021.01); *H01M 50/443* (2021.01); *H01M 50/446* (2021.01); *H01M 50/451* (2021.01); *H01M 50/46* (2021.01); *H01M 50/461* (2021.01); *H01M 50/489* (2021.01); *H01M 50/417* (2021.01)

(58) Field of Classification Search
None
See application file for complete search history.

(56) References Cited

U.S. PATENT DOCUMENTS

| | | | | |
|---|---|---|---|---|
| 2015/0162585 | A1* | 6/2015 | Pan ........................... | C08K 3/22 524/430 |
| 2019/0020008 | A1* | 1/2019 | Kim ................... | H01M 50/446 |
| 2020/0321579 | A1* | 10/2020 | Song ................... | H01M 50/451 |

(Continued)

FOREIGN PATENT DOCUMENTS

| | | | | |
|---|---|---|---|---|
| CN | 109378433 | A * | 2/2019 | ............ H01M 2/145 |
| KR | 2018-0076218 | A | 7/2018 | |
| KR | 10-2019-0022015 | A | 3/2019 | |

(Continued)

*Primary Examiner* — Robert S Carrico
(74) *Attorney, Agent, or Firm* — Harness, Dickey & Pierce, P.L.C.

(57) ABSTRACT

The present invention provides a secondary battery separator capable of guaranteeing the safety and performance of a secondary battery by improving the durability, heat resistance, adhesion to electrode, blocking lithium dendrite penetration, suppression of the polysulfide shuttle effect, and improving the cycle life of a secondary battery using the same.

7 Claims, 7 Drawing Sheets

(56) References Cited

U.S. PATENT DOCUMENTS

2022/0190321 A1* 6/2022 Tsuchikawa .......... H01M 4/364
2023/0238651 A1* 7/2023 Ka ...................... H01M 50/414
                                                        429/251

FOREIGN PATENT DOCUMENTS

KR   2021-0021729 A   3/2021
KR   2021-0119200 A   10/2021

* cited by examiner

SECONDARY BATTERY SEPARATOR TO IMPROVE THE BATTERY SAFETY AND CYCLE LIFE

CROSS-REFERENCE TO RELATED APPLICATION

This application claims priority to and the benefit of Korean Patent Application No. 10-2021-0135678, filed on Oct. 13, 2021, the disclosure of which is incorporated herein by reference in its entirety.

TECHNICAL FIELD

The present invention relates to a secondary battery separator, and more specifically relates to an ultra-thin multilayer secondary battery separator capable of guaranteeing the safety and performance of a secondary battery by improving the durability, heat resistance, adhesion to electrode, blocking lithium dendrite penetration, suppression of the polysulfide shuttle effect, and improving the cycle life of a secondary battery using the same.

BACKGROUND ART

Secondary batteries are one of the three core components of the information technology industry along with semiconductors and displays, which are applied in various fields such as small IT devices such as smartphones, artificial intelligence (AI), Internet of Things (IoT), drones, robots, power storage facilities (ESS), electric vehicles (EV) and the like, and the industrial importance thereof is expanding in the future.

A secondary battery consists of an anode, a cathode, a separator and an electrolyte, of which the separator is located between the anode and cathode to maintain the electrolyte as an insulator, to provide a path for ion conduction, and to partially melt and close pores when the temperature rises or an overcurrent flows, thereby performs a shutdown function that cuts off current. In addition, the separator is a material directly related to the safety of secondary batteries, as it plays a key role in thermal stability as well as in mechanical stability.

However, conventional separators used in secondary batteries have the following problems, and thus, it is difficult to utilize them in the next generation secondary batteries such as lithium-sulfur batteries and lithium-metal batteries.

First, in the case of conventional secondary battery separators, it cannot be implemented in the form of an ultra-thin film while maintaining the thermal properties required for secondary batteries with high energy density. That is, the heat resistance and thin thickness of the separator are in a trade-off relationship with each other, and a secondary battery separator that improves both of these at the same time has never been introduced.

Second, especially in the case of lithium secondary batteries with lithium-metal anodes, lithium dendrites formed on the anode due to interfacial instability between the separator and the anode, passed through the separator and a micro-short phenomenon occurred. Such lithium dendrites may be a serious problem in the stability and lifespan of secondary batteries, but a separator technology that effectively blocks the problems of the generation and movement of lithium dendrites has never been introduced.

Third, in order to improve the cycle efficiency, output and capacity characteristics of secondary batteries according to the recent trend of high capacity and high output required for secondary batteries, strong adhesion between the electrode and the separator in the case of a lithium-metal battery and suppression of the polysulfide shuttle effect in the case of a lithium-sulfur battery are required. The adhesion of such secondary battery separators is closely related to the deterioration of mechanical and electrical properties including the durability and heat resistance of secondary batteries as well as the above-described interfacial properties between the electrode and the separator, but there have been no reports of studies on secondary battery separators that satisfy all of these requirements.

Accordingly, despite the fact that the secondary battery separator can be implemented as an ultra-thin film, there is an urgent need to research a secondary battery separator capable of guaranteeing the safety and performance of a secondary battery by improving the durability, heat resistance, adhesion to electrode, blocking lithium dendrite penetration in a lithium-metal battery, suppression of the polysulfide shuttle effect in a lithium-sulfur battery, and improving the cycle life of a secondary battery using the same.

RELATED ART DOCUMENTS

Patent Documents (Patent Document 0001) Korean Patent Application Laid-Open No. 2019-0022015 (Mar. 6, 2019)

DISCLOSURE

Technical Problem

The present invention has been proposed to overcome the aforementioned problems, and the problem to be solved by the present invention is to provide an ultra-thin secondary battery separator capable of guaranteeing the safety and performance of a secondary battery by improving the durability, heat resistance, adhesion to electrode, blocking lithium dendrite penetration in a lithium-metal battery, suppression of the polysulfide shuttle effect in a lithium-sulfur battery, and improving the cycle life of a secondary battery using the same.

Technical Solution

In order to solve the aforementioned problems, the present invention provides a secondary battery separator, including a substrate, a first nano-ceramic layer facing a cathode and formed on one surface of the substrate, an active adsorption layer formed on the first nano-ceramic layer, a second nano-ceramic layer facing an anode and formed on one surface of the substrate, and an adhesion layer formed on the second nano-ceramic layer to form a uniform interfacial adhesion between the separator and the anode.

In addition, according to an exemplary embodiment of the present invention, the first nano-ceramic layer and the second nano-ceramic layer may include nano-ceramic particles and a binder.

In addition, according to another exemplary embodiment of the present invention, the nano-ceramic particles may comprise one or more selected from Al2O3, AlOOH, $SiO_2$, $SnO_2$, $CeO_2$, MgO, CaO, ZnO, $ZrO_2$, $TiO_2$ and talc.

In addition, according to still another exemplary embodiment of the present invention, the nano-ceramic particles may have an average particle diameter of 150 to 1,500 nm and an aspect ratio of 1 to 100.

In addition, according to an exemplary embodiment of the present invention, the amount of plate-shaped particles may be 5 to 50 wt. % of the total amount of nano-ceramic particles.

In addition, according to another exemplary embodiment of the present invention, all of the first nano-ceramic layer, the second nano-ceramic layer, the active adsorption layer and the adhesion layer may not include a cross-linkable polymer.

In addition, according to still another exemplary embodiment of the present invention, the active adsorption layer may include a carbon compound and hexagonal boron nitride (hBN).

In addition, according to an exemplary embodiment of the present invention, the carbon compound may be one or more selected from graphene, graphene oxide, fullerene, carbon nano tube (CNT), carbon black, graphite and carbon fiber.

In addition, according to another exemplary embodiment of the present invention, the thickness of the adhesion layer may be 0.1 to 1 μm.

In addition, according to still another exemplary embodiment of the present invention, the thicknesses of the first nano-ceramic layer and the second nano-ceramic layer may be 0.1 to 4 sm.

In addition, the present invention provides a lithium-sulfur secondary battery, including the above-described secondary battery separator.

In addition, the present invention provides a lithium-metal secondary battery, including the above-described secondary battery separator.

Advantageous Effects

The secondary battery separator according to the present invention can maximize the stability and lifespan of a secondary battery by preventing the "shuttle effect" and micro-short phenomenon caused by by-products generated from the anode and cathode, and at the same time, the thickness of the separator is implemented in the form of an ultra-thin film to maximize its utility as a raw material for electronic devices in the trend of miniaturization and integration and also to improve energy density, and thus, it is possible to increase the utility in various secondary battery industries that require high capacity and high output.

Furthermore, the secondary battery separator according to the present invention has excellent durability, heat resistance, mechanical strength, strong adhesion to electrodes and excellent electrical properties thereby guaranteeing the stability of the secondary battery and significantly improving the battery performance including the cycle life of the secondary battery using the same.

MODES OF THE INVENTION

Hereinafter, exemplary embodiments of the present invention will be described in detail such that those of ordinary skill in the art to which the present invention pertains can easily practice the same. The present invention may be embodied in various different forms and is not limited to the exemplary embodiments described herein.

As described above, the conventional separator used in the lithium secondary battery cannot exhibit excellent durability, heat resistance, mechanical strength, strong adhesion to electrodes and excellent electrical properties, and at the same time, it has a limitation in implementing a thin thickness, and thus, there have been considerable difficulties in applying the secondary battery using the same in various industrial fields.

As such, the present invention attempted to solve the above-described problems by providing a secondary battery separator, including a substrate, a first nano-ceramic layer facing a cathode and formed on one surface of the substrate, an active adsorption layer formed on the first nano-ceramic layer, a second nano-ceramic layer facing an anode and formed on one surface of the substrate, and an adhesion layer formed on the second nano-ceramic layer to form a uniform interfacial adhesion between the separator and the anode.

Through this, the secondary battery separator may be implemented as an ultra-thin film, and at the same time, excellent heat resistance and adhesion to the electrode may be exhibited, and furthermore, by guaranteeing the safety and performance of a secondary battery by improving the durability, heat resistance, adhesion to electrode, blocking lithium dendrite penetration in a lithium-metal battery, suppression of the polysulfide shuttle effect in a lithium-sulfur battery, and improving the cycle life of a secondary battery using the same, it can be utilized in various industrial fields.

Hereinafter, the secondary battery separator 100 according to the present invention will be described in detail.

Figure 1:
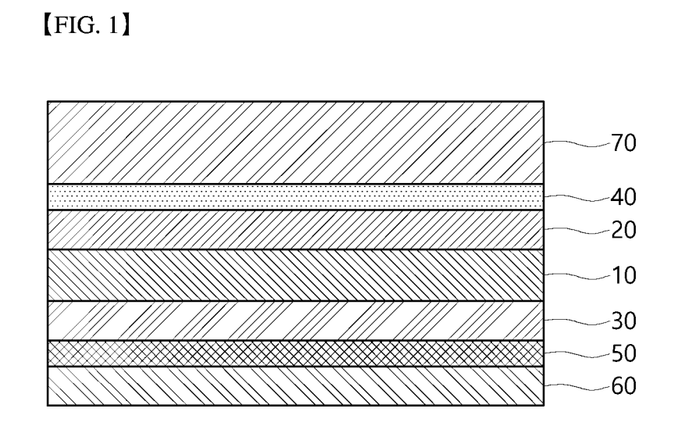
FIG. 1 is a cross-sectional view showing a secondary battery separator according to an exemplary embodiment of the present invention. The anode (negative electrode) 60 in lithium battery is typically made up of graphite, coated on copper foil or lithium-metal. The cathode (positive electrode) 70 in lithium battery is typically made of transition metal oxides or sulfides.

Referring to FIG. 1, the secondary battery separator 100 according to the present invention includes a substrate 10.

The substrate 10 may serve to transport lithium ions between the cathode 70 and the anode 60 while separating or insulating the cathode 70 and the anode 60 from each other. In this case, the substrate 10 may be made of a porous and non-conductive or insulating material, and the substrate may be used in the form of a film or by laminating the same, and a conventional porous non-woven fabric, for example, a non-woven fabric made of a glass fiber with a high melting point polyethylene terephthalate (PET) fiber and the like may be used, but is not limited thereto. That is, a conventional material suitable for the object of the present invention may be used, and as non-limiting examples thereof, any one or a mixture of two or more selected from the group consisting of polyolefin such as polyethylene (PE), polypropylene (PP) and the like, polyester such as polyethylene terephthalate, polybutylene terephthalate and the like, polyamide such as aramid, polyacetal, polycarbonate, polyimide, polyetherketone, polyethersulfone, polyphenylene oxide, polyphenylene sulfide, polyethylene naphthalene, polytetrafluoroethylene, polyvinylidene fluoride, polyvinyl chloride, polyacrylonitrile, cellulose and nylon may be used.

Meanwhile, when the substrate 10 is implemented in the form of the film, it may be made of PE or PP as a single material, but may include a multi-layer structure in which a PE layer and a PP layer are mixed or a film in which PE and PP are mixed in a single layer.

In this case, the substrate 10 may have a thickness of 1 μm to 100 μm, and more preferably, it may have a thickness of 3 μm to 30 μm. In this case, if the thickness of the substrate 10 is less than 1 μm, mechanical properties may be lowered, and the separator 100 may be easily damaged, and if the thickness of the substrate 10 is more than 100 μm, there is a problem in that the ultra-thin secondary battery separator of the present invention may not be implemented.

Next, the secondary battery separator 100 according to the present invention includes a first nano-ceramic layer 20 formed on one surface of the substrate 10 and facing a cathode 70, and a second nano-ceramic layer 30 formed on one surface of the substrate 10 and facing an anode 60.

It is an object of the present invention is to provide a secondary battery separator with excellent mechanical and electrical properties and the like despite having an ultra-thin film form that the conventional separator used in secondary batteries has not been able to achieve, and the object of the present invention may be achieved through the first and second nano-ceramic layers.

More specifically, when the heat resistance of the secondary battery separator is low, abnormal heat generation of the secondary battery may occur, and in this case, the separator may be continuously melted and damaged, and a short circuit between the anode and the cathode may occur. Therefore, as the separator used in the secondary battery is an insulator, excellent heat resistance is a physical property that must be secured not only for the lifespan and stability of the secondary battery itself, but also for the safety and efficiency of the various products using the same. However, such an attempt to improve the heat resistance of the secondary battery separator inevitably increases the thickness of the separator, and there is a problem in that it is not suitable for the next generation secondary batteries with high energy density.

As such, in the present invention, the ultra-thin film thickness and excellent heat resistance were simultaneously secured by including nano-ceramic particles in the first nano-ceramic layer 20 and the second nano-ceramic layer 30. In addition, by including such nano-ceramic particles, more space may be formed for active materials in the secondary battery compared to the batteries employing conventional thick separators, and an additional effect of improving the energy density of the secondary battery may be achieved.

Since the nano-ceramic particles have a high melting point and exhibit excellent heat resistance properties, a problem of deterioration of heat resistance due to oxidation or the like may not occur. Accordingly, the present invention may achieve the object of the invention described above by including such ceramic particles in the first nano-ceramic layer 20 and the second nano-ceramic layer 30.

Through this, the thicknesses of the first nano-ceramic layer 20 and the second nano-ceramic layer 30 of the secondary battery separator 100 according to the present invention may be implemented in the form of an ultra-thin film of 0.1 to 4 μm, respectively, and due to the thin nature of the first nano-ceramic layer 20 and the second nano-ceramic layer 30, the secondary battery separator 100 according to the present invention may be implemented in the form of an ultra-thin film. In addition, the thicknesses of the first nano-ceramic layer 20 and the second nano-ceramic layer 30 may be the same or different, but when these are formed to have the same thickness, it is more preferable because the problem due to curling of the separator during the manufacturing process of secondary batteries may be minimized.

In this case, if the thicknesses of the first nano-ceramic layer 20 and the second nano-ceramic layer 30 are less than 0.1 μm, respectively, it is difficult to expect the desired heat resistance improvement of the present invention, and if the thicknesses of the first nano-ceramic layer 20 and the second nano-ceramic layer 30 are more than 4 μm, respectively, there may be a problem in that it is difficult to implement the ultra-thin film desired by the present invention.

Figure 2:
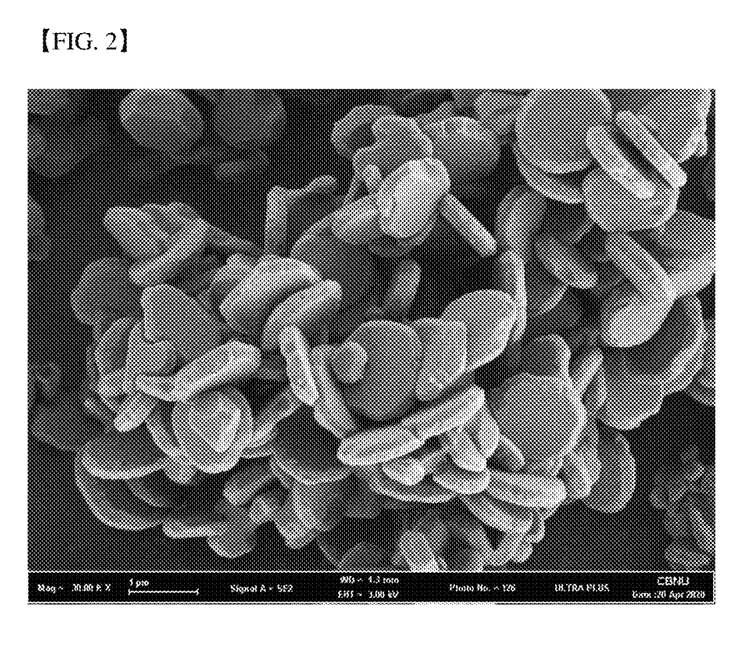
FIG. 2 is an SEM image of plate-shaped alumina constituting a nano-ceramic layer according to an exemplary embodiment of the present invention.
Figure 3:
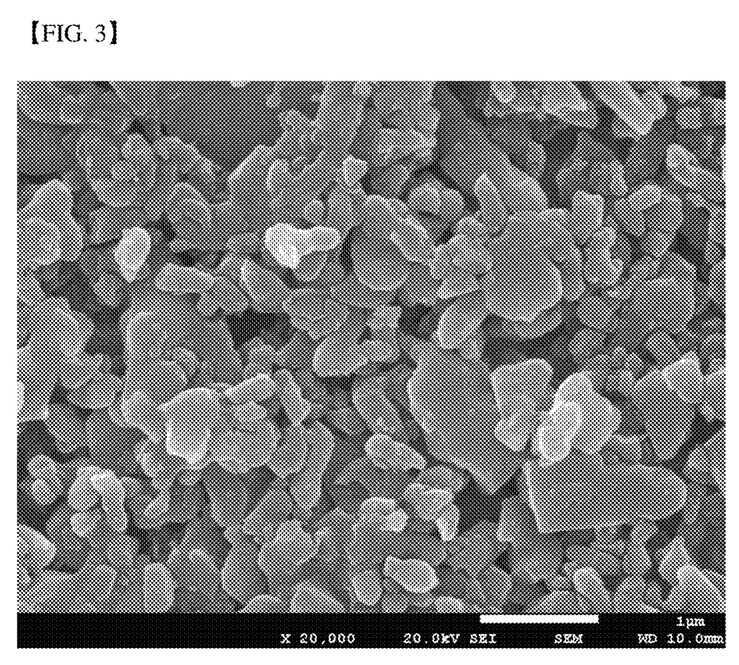
FIG. 3 is an SEM image of spherical alumina ($Al_2O_3$) constituting a nano-ceramic layer according to another embodiment of the present invention.
Figure 4:
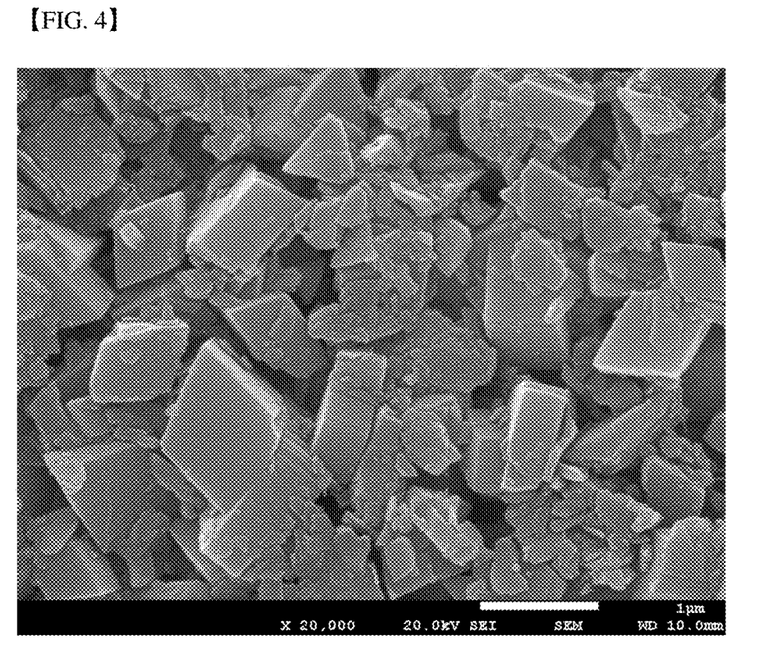
FIG. 4 is an SEM image of boehmite (AlOOH) constituting a nano-ceramic layer according to an exemplary embodiment of the present invention.

Meanwhile, in the present invention, in order to implement a separator having excellent mechanical properties while employing the ultra-thin film form, the nano-ceramic particles included in the first nano-ceramic layer 20 and the second nano-ceramic layer 30 may include at least one or more selected from $Al_2O_3$, AlOOH, $SiO_2$, $SnO_2$, $CeO_2$, MgO, CaO, ZnO, $ZrO_2$, $TiO_2$ and talc, and more preferably, as shown in FIGS. 2 to 4, a ceramic material having a two-dimensional structure such as plate-shaped nano-alumina ($Al_2O_3$) may be used. In other words, in the case of the plate-shaped alumina shown in FIG. 2, as it has a plate shape that is closer to two-dimension compared to spherical alumina (Al2O3) and boehmite (AlOOH) which are not the plate shape shown in FIG. 3, the thickness of the ceramic layer may be formed into a thinner film.

Meanwhile, by using inorganic particles in the form of a plate that is close to two-dimensional material rather than a three-dimensional material, the thickness of the separator may be manufactured to be significantly thinner, and more space may be formed for active materials in the secondary battery such that it has an effect of improving the energy density of the secondary battery. That is, the nano-ceramic particles included in the first nano-ceramic layer 20 and the second nano-ceramic layer 30 according to the present invention use a plate-shaped material having an aspect ratio and an average particle diameter in a specific numerical range. In this case, when a three-dimensional shape other than a plate-like shape is used, a problem may occur in which the thickness of the separator may be manufactured to be significantly increased and furthermore, it is not possible to secure a sufficient space for active materials in the secondary battery, and thus, there may be issues that it may not contribute to the high energy density of the secondary battery.

Figure 5:
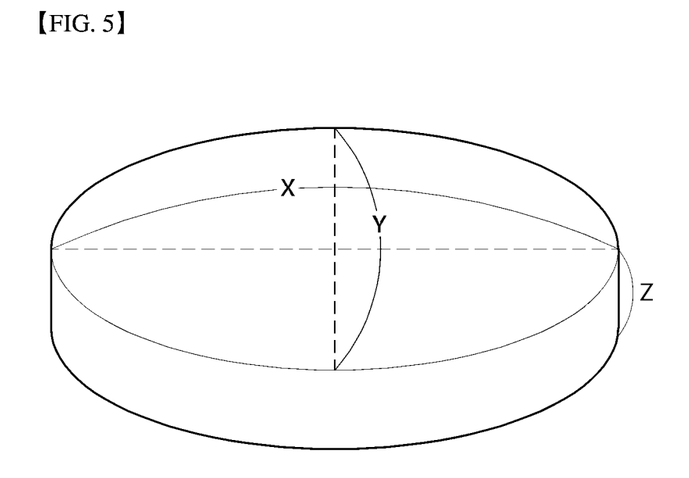
FIG. 5 is a view for explaining the aspect ratio of nano-ceramic particles according to an exemplary embodiment of the present invention.

In addition, the nano-ceramic particles may be plate-shaped particles having an average particle diameter (X) of 150 to 1,500 nm and an aspect ratio of 1 to 100, and more preferably, the nano-ceramic particles may be plate-shaped particles having an average particle diameter of 300 to 1,200 nm and an aspect ratio of 1.6 to 12, and the thickness (Z) of the nano-ceramic particles may be 10 to 500 nm, preferably, 100 to 300 nm.

In this case, as illustrated in FIG. 5, for the average particle diameter, when the nano-ceramic particles are included in a two-dimensional form according to a preferred example, the long axis X may mean the short axis Y, and the aspect ratio may mean X/Z, which is the ratio of the long axis X to the thickness Z.

In this case, if the average particle diameter of the nano-ceramic particles is shorter than 150 nm, an excessive cost increase may occur due to the difficulty of manufacturing uniform ceramic particles, and if the average particle diameter of the nano-ceramic particles is longer than 1,500 nm, there may be problems with lithium-ion transport due to the too large cross-sectional area.

In addition, if the aspect ratio is higher than 100, the thermal stability of the separator may be reduced as the shape of the nano-ceramic particles is changed from a plate-like shape to a needle-like shape, and if the aspect ratio is lower than 1, a problem may occur in which the production cost of uniform nano-ceramic particles increases sharply.

In particular, when the thickness is more than 1,000 nm, it is difficult to implement a separator having an ultra-thin form, which is the object of the present invention, and improvement of the energy density of the secondary battery may not be expected.

Meanwhile, in order for the two-dimensional plate-shaped nano-ceramic particles as described above to exhibit sufficient effects, the plate-shaped particles may be included at 5 to 50 wt. % of the total amount of the nano-ceramic particles, and more preferably, at 15 to 35 wt. %. In this case, if the two-dimensional plate-shaped particles are less than 5 wt. % based on 100 wt. % of the nano-ceramic particles, it is difficult to implement a thin separator. In addition, if the two-dimensional plate-shaped particles are more than 50 wt. % based on 100 wt. % of the nano-ceramic particles, there may be a problem in that the lithium-ion transport capacity of the separator is lowered.

Next, the first nano-ceramic layer 20 and the second nano-ceramic layer 30 may include a binder, but the present invention is not particularly limited, and a conventional binder known in the art may be used as long as it is a binder that meets the object of the present invention and is commonly used in secondary batteries. As non-limiting examples thereof, the binder may include a thermoplastic resin. For example, acrylic acid, ethyl methacrylate, methyl methacrylate, butyl methacrylate, pentyl methacrylate, octyl methacrylate, 2-ethylhexyl methacrylate, nonyl methacrylate, decyl methacrylate, lauryl methacrylate, 2-hydroxyethly methacrylate, 2-dimethylaminoethyl methacrylate, acrylonitrile, acrylamide, an acrylate polymer and the like may be used alone or in combination, but the present invention is not necessarily limited thereto, and any one that may be used as a binder in the art is possible.

In this case, the binder may be included at 5 to 50 parts by weight based on 100 parts by weight of the nano-ceramic particles. If the content of the binder is 5 parts by weight or less, delamination between the nano-ceramics and the substrate may occur, and if the content of the binder is 50 parts by weight or more, the transfer rate of lithium ions may be significantly lowered.

Next, the secondary battery separator 100 according to the present invention includes an active adsorption layer 40 formed on the first nano-ceramic layer 20. The "shuttle" effect is the main cause of degradation in a lithium-sulfur (Li—S) battery. The lithium polysulfide Li2Sx (6≤x≤8) is highly soluble in the common electrolytes used for lithium-sulfur batteries. They are formed and leaked from the cathode and they diffuse to the anode, where they are reduced to short-chain polysulfides and diffuse back to the cathode where long-chain polysulfides are formed again. This process results in the continuous leakage of active material from the cathode, lithium corrosion, low Coulombic efficiency and low battery life.

Accordingly, in previous studies, there have been attempts to add various adsorbent materials in a hybrid form to suppress the shuttle effect described above in a separator used in a lithium-sulfur secondary battery, but there was a limitation to physically blocking lithium polysulfide while improving the durability and heat resistance of the separator.

An object of the present invention is to provide a separator that effectively suppresses the shuttle effect without reducing mechanical properties such as durability, heat resistance and the like that the conventional separator used for secondary batteries could not solve, and through the active adsorption layer 40 described above, the object of the present invention may be achieved.

To this end, the active adsorption layer 40 included in the secondary battery separator 100 according to the present invention may include a carbon compound and hexagonal boron nitride (hBN).

The carbon compound according to the present invention is applied to the adsorption layer 40 of the secondary battery separator 100 to efficiently adsorb lithium polysulfide generated at the cathode to prevent the shuttle effect and side reactions that may occur on the surface of the anode, thereby improving the Coulomb efficiency and cycle stability of the battery. In addition, by solving the problem of capacity loss of sulfur caused by the shuttle effect it is possible to manufacture a high-capacity secondary battery and guarantee stability during operation. Moreover, as lithium polysulfide is adsorbed to the active adsorption layer 40, it is separated from the electrochemical reaction region of the anode and side reactions and the like may be minimized, thereby further improving the durability of the separator.

In this case, the carbon compound may include one or more selected from graphene, graphene oxide, fullerene, carbon nanotube (CNT), carbon black, graphite and carbon fiber, and more preferably include graphene oxide.

The graphene oxide adsorbs lithium polysulfide effectively and suppress the shuttle effect. That is, the carboxyl group of graphene oxide causes an electrostatic interaction and effectively suppresses the movement of negatively charged polysulfide ions without interfering with the movement of positively charged lithium ions.

The graphene oxide in which a functional group including oxygen is present on the surface or inside and various types of defects exist may be used. In addition, a hydroxyl group may be present on the surface and inside the graphene oxide, and in addition, it may include a functional group such as a carboxyl group, a carbonyl group, an epoxy group, an ester group, an ether group, an amide group, an amino group or the like. In this case, the graphene oxide has hydrophilicity due to the functional groups and is dispersed in an aqueous solution or a hydrophilic solvent, and may be in the form of a sheet or flake having a very thin thickness, which is exfoliated by ultrasonic wave treatment. More preferably, the graphene oxide may have a two-dimensional plate-like structure in order to implement a separator in the form of an ultra-thin film.

That is, the graphene oxide may have a thickness of 0.5 to 20 nm, and more preferably may have a thickness of 1 to 15 nm. In addition, the graphene oxide particles may have a length of 0.1 to 10 μm, and more preferably, it may have a two-dimensional plate-like particle structure having a particle length of 1 to 5 sm. As such, even when several layers are stacked, there may be an advantage in maintaining the thickness of the nano-level ultra-thin film of the separator.

Meanwhile, when the active adsorption layer 40 uses only a carbon compound alone, lithium-ion diffusion path may be restricted, and thus, the active adsorption layer 40 according to the present invention may further include two-dimensional hBN in addition to the carbon compound.

More specifically, when multiple layers of graphene oxide having a two-dimensional plate-like structure are stacked to form the active adsorption layer 40 according to an exemplary embodiment of the present invention described above, the graphene oxide does not form a channel at a sufficient level such that the transfer of lithium ions may not be easily achieved. Such a low lithium-ion transport rate may increase impedance inside the battery along with low lithium-ion conductivity, resulting in a problem of deteriorating the performance (i.e., specific capacity) of the battery.

Accordingly, the present invention may further include hBN in addition to graphene oxide in the active adsorption layer 40 according to the present invention in order to solve the above-described problems.

The hBN exhibits excellent electrical insulation, has high stability in organic solvents, and further has excellent heat resistance. In addition, above all else, it is possible to easily secure a lithium-ion diffusion and also improve the desired thermal properties of the separator using the same.

In this case, the hBN particles may have a thickness of 5 to 50 nm, and more preferably, a thickness of 10 to 50 nm. In addition, the hBN may have a particle length of 0.05 to 10 μm, and more preferably have a two-dimensional plate-like structure having a particle length of 0.1 to 10 μm. Furthermore, when the hBN has a two-dimensional plate-like structure, it may exhibit a surface area of 20 to 600 $m^2/g$, and more preferably have a surface area of 50 to 500 $m^2/g$.

In this case, when the thickness of the hBN is more than 50 nm or the particle length is less than 0.05 μm or the surface area is less than 20 $m^2/g$, it may be difficult to form a plate-like structure in a two-dimensional shape, and when the particle length is more than 10 μm or the surface area is more than 600 $m^2/g$, it may not be easy to secure a diffusion path for lithium ions.

Meanwhile, when the active adsorption layer 40 of the present invention includes two-dimensional plate-shaped graphene oxide and hBN according to the above-described preferred example, the graphene oxide and hBN may be included at a weight ratio of 1:1 to 1:5. In this case, when the content of graphene oxide is less than the above weight ratio, the adsorption of lithium polysulfide is insufficient, and when the content of hBN is less than the above weight ratio, the diffusion path of lithium ions in the adsorption layer is not sufficiently secured such that the ion conductivity through the active adsorption layer may be lowered. Conversely, when the content of graphene oxide is more than the above weight ratio, the ion conductivity is lowered, and when the content of hBN is more than the above weight ratio, the thermal stability of the separator may be reduced.

In addition, the active adsorption layer 40 may further include a binder.

The binder may be included at an amount of 1 to 30 parts by weight based on 100 parts by weight of the total amount of graphene oxide and hBN particles, and it may be an acrylate polymer including at least one functional group selected from the group consisting of an OH group, a COOH group, a CN group, an amine group and an amide group. As non-limiting examples thereof, the binder may include acrylic acid, ethyl methacrylate, methyl methacrylate, butyl (meth)acrylate, pentyl (meth)acrylate, octyl (meth)acrylate, 2-ethylhexyl (meth)acrylate, nonyl (meth)acrylate, decyl (meth)acrylate, lauryl (meth)acrylate, hydroxyethyl methacrylate, 2-dimethylaminoethyl methacrylate, acrylonitrile, acrylamide, an acrylate polymer and a mixture thereof.

Next, the secondary battery separator 100 according to the present invention includes an adhesion layer 50 formed on the second nano-ceramic layer 30.

There have been attempts to add various materials in a hybrid form to the separator used in conventional lithium secondary batteries or lithium-metal secondary batteries to prevent the generation of lithium dendrites and inhibit growth, but there was a limitation in physically blocking lithium dendrites while improving the durability and heat resistance of the separator.

Accordingly, the present invention may achieve the object of the present invention through the adhesion layer 50 described above.

More specifically, the present invention enables uniform interfacial adhesion between the separator and the electrode through the above-described adhesion layer 50, and prevents lithium dendrites from growing at the anode.

In particular, there is an example of using a cross-linkable polymer as part of an effort to improve the adhesion between the secondary battery separator and the electrode, but in this case, since it was not possible to prevent the delamination phenomenon between the separator and the electrode, uniform adhesion between the separator and the electrode was difficult, and as a result, there was a difficulty in minimizing the occurrence of lithium dendrites.

Accordingly, by including an adhesion layer 50, the secondary battery separator 100 according to the present invention solves the problems caused by the conventional cross-linkable polymer and enables uniform interfacial adhesion between the separator and the electrode, thereby significantly improving the performance of secondary batteries. That is, since the present invention does not include a cross-linkable polymer in any one of the first nano-ceramic layer 20, the second nano-ceramic layer 30, the active adsorption layer 40 and the adhesion layer 50, it is possible to prevent the delamination phenomenon of the electrode and the separator caused by using the conventional cross-linkable polymer, and moreover, by including the adhesion layer 50, the interfacial adhesion with the electrode may be further improved and at the same time, the generation of lithium dendrites may be minimized.

In this case, the adhesion layer 50 is capable of uniform adhesion between the above-described separator and the electrode, and a conventional adhesive material with excellent durability and heat resistance may be used. As non-limiting examples thereof, at least one selected from the group consisting of polyvinyl alcohol (PVA), carboxymethylcellulose (CMC), polyvinylpyrrolidone and acrylate polymers may be used.

Meanwhile, the thickness of the adhesion layer 50 may be 0.1 to 1 sm. If the thickness of the adhesion layer 50 is more than 1 μm, the resistance to the ion conductivity increases and it may adversely affect battery performance, and if the thickness of the adhesion layer 50 is less than 0.1 μm, there may be a problem in that the cycle life of the battery may not be expected to be improved because a sufficient binding force between the separator and the electrode is not provided.

In addition, the adhesion layer 50 may further include a binder.

The binder may be included at an amount of 1 to 30 parts by weight based on 100 parts by weight of the total amount of the adhesive material described above, and it may be an acrylate polymer including at least one functional group selected from the group consisting of an OH group, a COOH group, a CN group, an amine group and an amide group. As non-limiting examples thereof, the binder may include acrylic acid, ethyl methacrylate, methyl methacrylate, butyl (meth)acrylate, pentyl (meth)acrylate, octyl (meth)acrylate, 2-ethylhexyl (meth)acrylate, nonyl (meth)acrylate, decyl (meth)acrylate, lauryl (meth)acrylate, hydroxyethyl methacrylate, 2-dimethylaminoethyl methacrylate, acrylonitrile, acrylamide, an acrylate polymer and a mixture thereof.

Next, the present invention provides a lithium secondary battery including the secondary battery separator described above.

The lithium secondary battery may be classified into a cylindrical shape, a prismatic shape, a coin shape, a pouch shape, and the like according to the shape. Since the structure and manufacturing method of these batteries are well known in the art, detailed descriptions thereof will be omitted.

In addition, the lithium secondary battery according to the present invention may be used as a power source for devices requiring such characteristics as a high energy density. Specific examples of the device may include power tools, electric vehicles including electric vehicles (EVs), hybrid electric vehicles (HEVs), plug-in hybrid electric vehicles (PHEVs) and the like electric two-wheeled vehicles including electric bicycles (E-bike) and electric scooters (E-scooter), electric golf carts, energy storage systems (ESS) and the like, but is not limited thereto.

As described above, the secondary battery separator according to the present invention may form a secondary battery separator as an ultra-thin film by implementing asymmetrically with respect to the substrate 10 as described above. Furthermore, since it has excellent mechanical and electrical properties such as durability, heat resistance, adhesion to electrode, blocking lithium dendrite penetration in a lithium-metal battery, suppression of the polysulfide shuttle effect in a lithium-sulfur battery, it is possible to guarantee the stability of the secondary battery and to improve battery performance including the cycle life of secondary batteries using the same, thereby promoting utilization in various industrial fields.

Next, the manufacturing method of a secondary battery separator according to the present invention will be described, and descriptions of the same parts as the secondary battery separator described above will be omitted to avoid overlap.

The secondary battery separator according to the present invention may be manufactured by including (a) forming a first nano-ceramic layer 20 a cathode direction by coating the first cathode-direction coating composition on the cathode 70 direction surface of a substrate 10 for a secondary battery separator, (b) forming an active adsorption layer 40 by coating a secondary cathode-direction coating composition on the first nano-ceramic layer 20, (c) forming a second nano-ceramic layer 30 by coating the first anode-direction coating composition on the anode 60 direction surface of the substrate 10 and (d) forming an adhesion layer 50 by coating a secondary anode-direction coating composition on the second nano-ceramic layer 30.

In the steps (a) and (c), the first cathode-direction coating composition and the first anode-direction coating composition forming the first nano-ceramic layer 20 and the second nano-ceramic layer 30 may include nano-ceramic particles, a binder and a remaining amount of solvent.

The nano-ceramic particles may include at least one selected from $Al_2O_3$, AlOOH, $SiO_2$, $SnO_2$, $CeO_2$, MgO, CaO, ZnO, $ZrO_2$, $TiO_2$ and talc, and more preferably a ceramic material having a two-dimensional structure such as plate-shaped nano-alumina may be used, and in this case, the thickness of the nano-ceramic layer may be formed as a thinner film.

In addition, the nano-ceramic particles may be plate-shaped particles having an average particle diameter (X) of 150 to 1,500 nm and an aspect ratio of 1 to 100, more preferably, the nano-ceramic particles may be plate-shaped particles having an average particle diameter of 300 to 1,200 nm and an aspect ratio of 1.6 to 12, and the thickness (Z) of the nano-ceramic particles may be 10 to 500 nm, and preferably, 100 to 300 nm.

Meanwhile, in order for the two-dimensional plate-shaped nano-ceramic particles as described above to exhibit sufficient effects, the plate-shaped particles may be included at 5 to 50 wt. % based on 100 wt. % of the total amount of the nano-ceramic particles, and more preferably, at 15 to 35 wt. %. In this case, if the two-dimensional plate-shaped particles are less than 5 wt. % based on 100 wt. % of the nano-ceramic particles, it is difficult to implement a thin separator. In addition, if the two-dimensional plate-shaped particles are more than 50 wt. % based on 100 wt. % of the nano-ceramic particles, there may be a problem in that the lithium-ion transport capacity of the separator is lowered.

The binder is not particularly limited in the present invention, and a known conventional binder may be used as long as it meets the object of the present invention and is commonly used in secondary batteries.

In this case, the binder may be included at 20 to 50 parts by weight based on 100 parts by weight of the nano-ceramic particles. If the content of the binder is 20 parts by weight or less, delamination between the nano-ceramics and the substrate may occur, and if the content of the binder is 50 parts by weight or more, the transfer rate of lithium ions may be significantly lowered.

The solvent may sufficiently disperse the nano-ceramic particles, and as long as it meets the object of the present invention, a conventional solvent may be used, and a non-limiting example thereof may be a mixed solvent of water and alcohol, in which case the alcohol may be a lower alcohol having 1 to 6 carbon atoms, preferably, methanol, ethanol, propanol (propyl alcohol), isopropyl alcohol or the like. Preferably, water or a mixed solvent of water and a lower alcohol may be used. In addition, the content of the solvent may be contained at a level having a concentration capable of facilitating coating, and is not particularly limited thereto.

Next, the secondary anode-direction coating composition of step (b) may include a carbon compound, hBN, a binder and a remaining amount of solvent.

In this case, the carbon compound and hBN may be included at a weight ratio of 1:1 to 1:5, and the binder may be included at an amount of 1 to 30 parts by weight based on 100 parts by weight of the total amount of the carbon compound and hBN particles, and the amount of the solvent is sufficient as long as it is an amount in which the carbon compound and hBN may be sufficiently dispersed, and is not particularly limited thereto.

The secondary anode-direction coating composition of step (d) may include an adhesive material, a binder and a remaining amount of solvent.

As the adhesive material, a conventional adhesive material that enables uniform adhesion between the separator and the electrode and does not deteriorate the durability, heat resistance and mechanical properties of an ultra-thin separator, which is the object of the present invention, may be used. As non-limiting examples thereof, at least one selected from the group consisting of polyvinyl alcohol, carboxymethyl cellulose, polyvinylpyrrolidone and acrylate polymers may be used.

In addition, the binder may be included at an amount of 1 to 30 parts by weight based on 100 parts by weight of the total amount of the above-described adhesive material, and the amount of the solvent is sufficient as long as it is an amount in which the adhesive material is sufficiently dispersed, and is not particularly limited thereto.

Meanwhile, the coating composition of steps (a) to (d) may be coated by a coating method which is conventional in the art for secondary battery separators, and while it is not particularly limited, as non-limiting examples thereof, it may be coated by at least one method selected from spraying, casting, dip coating, slot die coating, coma coating, bar coating, wire bar coating, gravure coating, microgravure coating and DM coating (direct metering, DM). More preferably, a wire-slot coating (WS) method may be used by using a die in which a wire bar and a slot die are combined.

Hereinafter, the present invention will be described in more detail through examples, but the following examples are not intended to limit the scope of the present invention, and these should be construed to help the understanding of the present invention.

Example 1—Manufacture of Separator (1) Formation of Nano-Ceramic Layers

By mixing and stirring plate-shaped nano-alumina having a thickness of 200 nm and an average particle diameter of 1,000 nm and spherical alumina having an average particle diameter of 400 nm at a weight ratio of 25:75 as nano-ceramic particles and 2-dimethylaminoethyl methacrylate and an acrylonitrile copolymer as a binder in an aqueous solution (30 wt. % concentration), a nano-ceramic coating composition was prepared in which the weight ratio of plate-shaped nano-alumina and the binder was 5:2. The composition of the final coating solution was adjusted to the content of water used as a solvent such that the solid content was 35 wt. %.

Afterwards, the prepared nano-ceramic coating composition was formed into a first nano-ceramic layer in a cathode direction and a second nano-ceramic layer in an anode direction on a 12 μm-thick polyethylene (PE) separator substrate using a wire-slot (WS) coating process.

(2) Formation of Active Adsorption Layer

After mixing a graphene oxide aqueous dispersion (1 wt. % concentration, thickness 10 nm, length 1 μm, surface area 500 $m^2/g$) and a hBN aqueous dispersion (2 wt. % concentration, thickness 30 nm, length 1 μm, surface area 200 $m^2/g$), 20 parts by mass of 2-dimethylaminoethyl methacrylate and an acrylonitrile copolymer as a binder based on 100 parts by mass of the mixed solution of the graphene oxide aqueous dispersion and the hBN aqueous dispersion were mixed and stirred to prepare an active adsorption layer coating composition in which the weight ratio of graphene oxide and hBN was 1:2 (graphene oxide and hBN aqueous dispersion:binder=5:1 weight ratio). The composition of the final coating solution was adjusted to the content of water used as a solvent such that the solid content was 15 wt. %.

Afterwards, the prepared active adsorption layer coating composition was formed on the first nano-ceramic layer using a wire-slot (WS) coating process.

(3) Formation of Adhesion Layer

For an adhesion layer, an adhesion layer coating composition was prepared by mixing and stirring carboxymethyl cellulose (CMC) and water as a solvent. The composition of the final coating solution was adjusted to the content of water used as a solvent such that the solid content was 15 wt. %.

Afterwards, the prepared adhesion layer coating composition was used on the second nano-ceramic layer to form an adhesion layer using a wire-slot (WS) coating process, and then, a separator for a secondary battery was manufactured.

Examples 2 to 12

Separators for secondary batteries were manufactured in the same manner as in Example 1, except that the thickness and average particle diameter of plate-shaped alumina included in (1) the nano-ceramic coating composition in Example 1 were changed or the content with spherical alumina was changed as shown in Table 1 below.

TABLE 1

| | Nano-ceramic particles | | | | | |
|---|---|---|---|---|---|---|
| Classification | Type | Form | Thickness (nm) | Average particle diameter (nm) | Aspect ratio | Weight (%) |
| Example 1 | Alumina | Plate shape | 200 | 1000 | 5 | 25 |
| | | Spherical | — | 400 | — | 75 |
| Example 2 | Alumina | Plate shape | 50 | 1000 | 20 | 25 |
| | | Spherical | — | 400 | — | 75 |
| Example 3 | Alumina | Plate shape | 400 | 1000 | 2.5 | 25 |
| | | Spherical | — | 400 | — | 75 |
| Example 4 | Alumina | Plate shape | 20 | 1000 | 50 | 25 |
| | | Spherical | — | 400 | — | 75 |
| Example 5 | Alumina | Plate shape | 800 | 1000 | 1.25 | 25 |
| | | Spherical | — | 400 | — | 75 |
| Example 6 | Alumina | Plate shape | 200 | 1000 | 5 | 0 |
| | | Spherical | — | 400 | — | 100 |
| Example 7 | Alumina | Plate shape | 200 | 1000 | 5 | 50 |
| | | Spherical | — | 400 | — | 50 |
| Example 8 | Alumina | Plate shape | 200 | 1000 | 5 | 10 |
| | | Spherical | — | 400 | — | 90 |
| Example 9 | Alumina | Plate shape | 200 | 1000 | 5 | 75 |
| | | Spherical | — | 400 | — | 25 |
| Example 10 | Alumina | Plate shape | 200 | 100 | 0.5 | 25 |
| | | Spherical | — | 400 | — | 75 |

TABLE 1-continued

| | Nano-ceramic particles | | | | | |
|---|---|---|---|---|---|---|
| Classification | Type | Form | Thickness (nm) | Average particle diameter (nm) | Aspect ratio | Weight (%) |
| Example 11 | Alumina | Plate shape | 200 | 2500 | 12.5 | 25 |
| | | Spherical | — | 400 | — | 75 |
| Example 12 | Alumina | Plate shape | 200 | 1000 | 5 | 25 |
| | Boehmite | Spherical | — | 400 | — | 75 |

Comparative Example 1

A separator for a secondary battery was manufactured in the same manner as in Example 1, except that the active adsorption layer and the adhesion layer in Example 1 were omitted.

Experimental Example 1—Measurement of Air Permeability

The time taken for 100 cc of air to permeate through the secondary battery separators obtained in the Examples and Comparative Examples was measured using an air permeability (Gurley) measurement method, and the result is shown in Table 2 below.

Experimental Example 2—Measurement of Thermal Shrinkage of Separator

The secondary battery separators obtained in the Examples and Comparative Examples were left in an oven at 120° C. or 130° C. for 1 hour, and then the shrinkage rate was measured in the Machine Direction (MD)/Transverse Direction (TD), and the result is shown in Table 2 below.

TABLE 2

| | | | Heat shrinkage rate (%) | | | |
|---|---|---|---|---|---|---|
| | Thickness of separator | Air permeability | 120° C., 1 hour | | 130° C., 1 hour | |
| | (μm) | (sec/100 cc) | MD | TD | MD | TD |
| Example 1 | 15 | 190 | 0.1 | 0.0 | 0.5 | 0.4 |
| Example 2 | 15 | 181 | 2.5 | 1.5 | 5.4 | 2.6 |
| Example 3 | 15 | 249 | 0.0 | 0.0 | 0.4 | 0.3 |
| Example 4 | 15 | 164 | 3.1 | 1.9 | 7.2 | 4.1 |
| Example 5 | 15 | 378 | 0.0 | 0.0 | 0.2 | 0.1 |
| Example 6 | 17 | 171 | 1.4 | 1.1 | 3.9 | 2.0 |
| Example 7 | 14 | 210 | 2.7 | 1.8 | 6.8 | 3.8 |
| Example 8 | 17 | 175 | 1.5 | 1.1 | 4.1 | 2.2 |
| Example 9 | 14 | 253 | 4.3 | 3.1 | 15.8 | 12.6 |
| Example 10 | 15 | 168 | 0.0 | 0.0 | 0.3 | 0.2 |
| Example 11 | 15 | 307 | 15.6 | 8.9 | 27.5 | 24.4 |
| Example 12 | 15 | 160 | 0.8 | 0.7 | 3.5 | 3.0 |
| Comparative Example 1 | 14 | 180 | 0.1 | 0.1 | 0.4 | 0.3 |

Referring to Tables 1 and 2, in the case of Example 1 in which the nano-ceramic particles satisfied all of the numerical ranges for the thickness, average particle diameter, aspect ratio and weight of the present invention, it can be seen that the air permeability and heat shrinkage rate were the most excellent at the same time.

More specifically, when the aspect ratio of the nano-ceramic particles according to the present invention had a value more than the upper limit of the numerical range of the present invention (Example 4) or a value less than the lower limit thereof (Example 10), it can be seen that there is a marked deterioration in the air permeability or heat shrinkage rate.

In addition, when the weight of the plate-shaped particles among the nano-ceramic particles according to the present invention had a value more than the upper limit of the numerical range of the present invention (Examples 7 and 9) or these were not included (Example 6), it can be seen that air permeability and heat shrinkage rate were not satisfied at the same time.

Through this, it can be seen that the present invention may obtain the desired result only when the nano-ceramic particles according to the present invention are included, and all of the thickness, aspect ratio and weight % are satisfied.

Experimental Example 3—Manufacture of Lithium Secondary Batteries and Charging/Discharging Experiments A sulfur-carbon composite was obtained by mixing electroconductive carbon and sulfur through a ball mill process. Afterwards, a cathode slurry was prepared at a ratio of 90 g of an active composite material, 5 g of Super-P as a conductive material and 5 g of polyvinylidene fluoride as a binder, and then it was coated on an aluminum current collector to prepare a cathode. Afterwards, a lithium-metal having a thickness of 200 μm was used as the anode, and LiTFSI-DME/DOL at a concentration of 1M and a LiNO$_3$ mixture at a concentration of 0.4 M were used as an electrolyte, and lithium secondary batteries were manufactured using the secondary battery separators obtained in Example 1 and Comparative Example 1.

Figure 6:
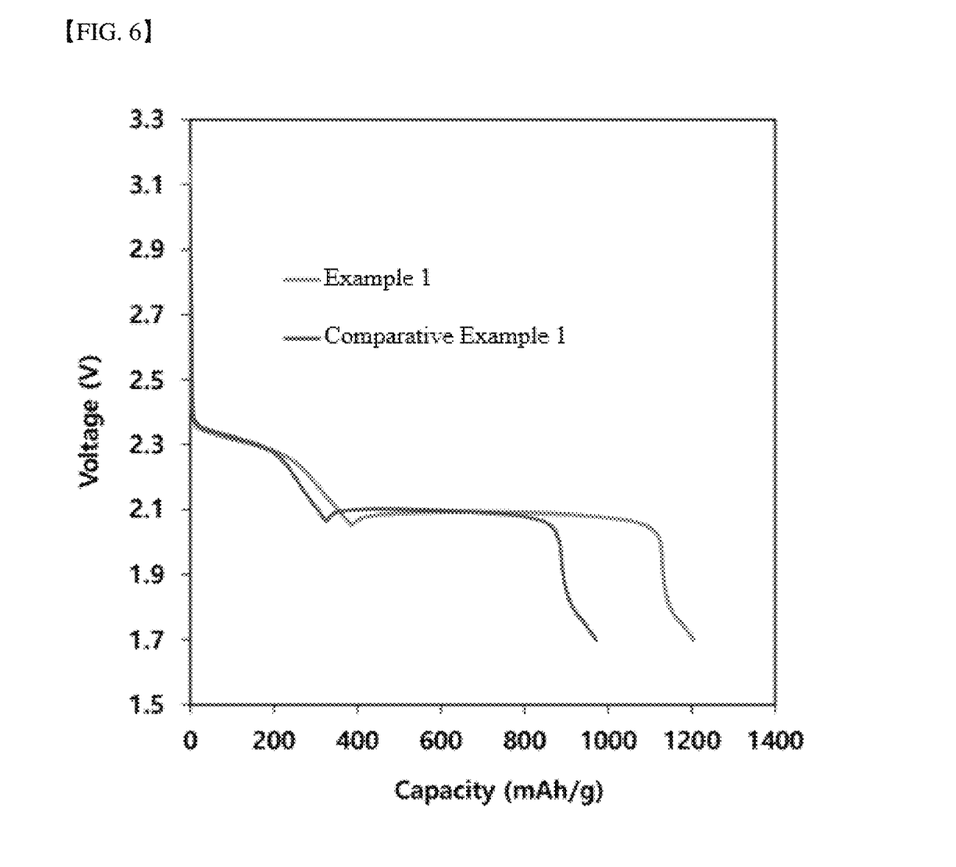
FIG. 6 is a graph showing the initial discharge capacities of secondary batteries manufactured according to Example 1 and Comparative Example 1.
Figure 7:
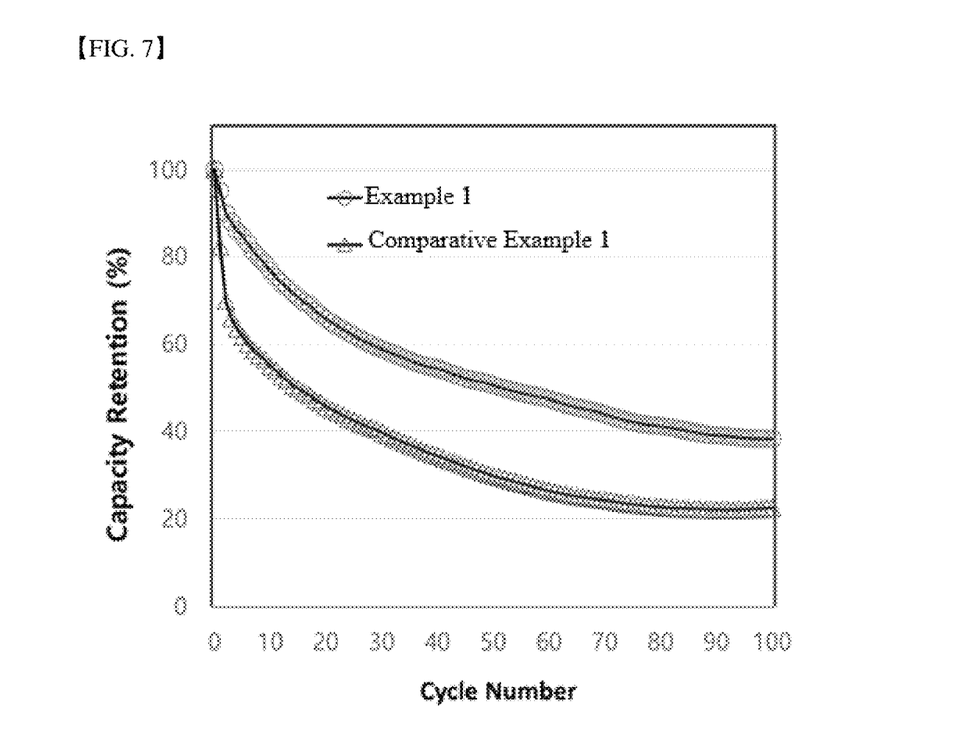
FIG. 7 is a graph showing the lifespan characteristics of secondary batteries manufactured according to Example 1 and Comparative Example 1.

Next, the manufactured lithium secondary batteries were operated under a 0.1 C charge/discharge condition, and the initial charge/discharge capacity was measured, and after measuring the capacity change by performing 100 cycles, the results were illustrated in FIGS. 6 and 7.

Referring to FIG. 6 showing the initial discharge capacities of Example 1 and Comparative Example 1, and FIG. 7 showing the lifespan characteristics of Example 1 and Comparative Example 1, it can be seen that the secondary battery manufactured in Example 1 including both the active adsorption layer and the adhesion layer according to the present invention had a higher initial discharge capacity than the secondary battery manufactured in Comparative Example 1 which did not include the same.

In addition, in the case of the secondary battery manufactured in Example 1 including both of the active adsorption layer and the adhesion layer according to the present invention, it can be seen that it exhibited lifespan characteristics with an excellent capacity retention rate compared to the secondary battery manufactured in Comparative Example 1 which did not include the same.

Through this, it can be seen that in the case of a secondary battery provided with a separator including both the active adsorption layer and the adhesion layer according to the present invention, lithium polysulfide was effectively adsorbed during battery operation and at the same time lithium-dendrite penetration through the separator did not occur, thereby exhibiting high initial charge/discharge capacities and excellent lifespan characteristics.

The invention claimed is:

1. A secondary battery separator, comprising:
a substrate;
a first nano-ceramic layer facing a cathode and formed on one surface of the substrate;
an active adsorption layer formed on the first nano-ceramic layer;
a second nano-ceramic layer facing an anode and formed on one surface of the substrate; and
an adhesion layer formed on the second nano-ceramic layer to form a uniform interfacial adhesion between the separator and the anode,
wherein the first nano-ceramic layer and the second nano-ceramic layer comprise nano-ceramic particles and a binder,
wherein the nano-ceramic particles comprise plate-shaped nano alumina and spherical alumina,
wherein the plate-shaped nano alumina has an average particle diameter of 300 to 1,200 nm, an aspect ratio of 1.6 to 12 and a thickness of 100 to 300 nm, and
wherein the plate-shaped nano alumina is comprised in an amount of 15 to 35 wt. % based on 100 wt. % of the nano-ceramic particles.

2. The secondary battery separator of claim 1, wherein all of the first nano-ceramic layer, the second nano-ceramic layer, the active adsorption layer and the adhesion layer do not comprise a cross-linkable polymer.

3. The secondary battery separator of claim 1, wherein the active adsorption layer comprises a carbon compound and hexagonal boron nitride (hBN).

4. The secondary battery separator of claim 3, wherein the carbon compound is one or more selected from graphene, graphene oxide, fullerene, carbon nano tube (CNT), carbon black, graphite and carbon fiber.

5. The secondary battery separator of claim 1, wherein the thickness of the adhesion layer is 0.1 to 1 μm, and the thicknesses of the first nano-ceramic layer and the second nano-ceramic layer are 0.1 to 4 μm.

6. A lithium-sulfur secondary battery, comprising the secondary battery separator according to claim 1.

7. A lithium-metal secondary battery, comprising the secondary battery separator according to claim 1.

* * * * *